(12) United States Patent
Yamashita et al.

(10) Patent No.: US 6,527,990 B2
(45) Date of Patent: Mar. 4, 2003

(54) METHOD FOR PRODUCING A RUBBER GLOVE

(75) Inventors: Shinzo Yamashita, Kyoto (JP); Masaru Fujii, Hyogo-ken (JP); Tadao Nishimatsu, Hyogo-ken (JP)

(73) Assignee: Hirono Chemical Ind. Co., Ltd., Hyogo-ken (JP)

( * ) Notice: Subject to any disclaimer, the term of this patent is extended or adjusted under 35 U.S.C. 154(b) by 0 days.

(21) Appl. No.: 09/770,394

(22) Filed: Jan. 29, 2001

(65) Prior Publication Data

US 2001/0011387 A1 Aug. 9, 2001

(30) Foreign Application Priority Data

Jan. 31, 2000 (JP) ......................................... 2000-021478

(51) Int. Cl.[7] .......................... B29C 41/18; B29C 44/06
(52) U.S. Cl. ........................ 264/45.1; 264/53; 264/255; 264/302; 264/306
(58) Field of Search ................................. 264/255, 302, 264/53, 306, 45.1

(56) References Cited

U.S. PATENT DOCUMENTS

| | | | | |
|---|---|---|---|---|
| 3,859,410 A | * | 1/1975 | Sidley | 264/306 |
| 4,047,251 A | * | 9/1977 | Stockum | 2/168 |
| 4,102,844 A | * | 7/1978 | Schwinum et al. | 264/306 |
| 4,143,109 A | * | 3/1979 | Stockum | 264/112 |
| 4,329,312 A | * | 5/1982 | Ganz | 264/306 |
| 4,519,098 A | * | 5/1985 | Dunmire et al. | 264/306 |
| 5,138,719 A | * | 8/1992 | Orlianges et al. | 264/305 |
| 5,326,515 A | * | 7/1994 | Sakaki et al. | 264/305 |
| 5,817,365 A | * | 10/1998 | Richardson et al. | 264/307 |
| 5,833,911 A | * | 11/1998 | Llort et al. | 264/306 |
| 6,019,922 A | * | 2/2000 | Hassan et al. | 264/306 |
| 6,280,673 B1 | * | 8/2001 | Green et al. | 264/255 |

* cited by examiner

Primary Examiner—Allan R. Kuhns
(74) Attorney, Agent, or Firm—Roylance, Abrams, Berdo & Goodman, L.L.P.

(57) ABSTRACT

A rubber glove is produced by sequentially performing the step of immersing a glove mold in a coagulating synthetic rubber latex containing synthetic rubber in latex form, thermally expansible microcapsules, and a rubber coagulant to form a coagulant-containing synthetic rubber film on the surface of the glove mold; the step of immersing the glove mold in rubber-incorporating latex to form a gelled rubber layer; the step of heating a rubber laminate composed of the synthetic rubber film and the gelled rubber layer to vulcanize the rubber laminate; and the step of turning the vulcanized rubber laminate inside out, and removing it from the glove mold. This method produces a rubber glove, which is excellent in anti-blocking properties and grip under dry or wet conditions, by a simple procedure and for a low cost.

26 Claims, 1 Drawing Sheet

METHOD FOR PRODUCING A RUBBER GLOVE

BACKGROUND OF THE INVENTION

The present invention relates to a method for producing a rubber glove comprising natural rubber or synthetic rubber. More particularly, the invention relates to a rubber glove for home use, examination, operation and work, which is hygienic and can be easily worn and removed, and a method capable of producing the rubber glove stably and continuously.

Generally, a rubber glove produced from natural rubber or synthetic rubber is tacky on its inner and outer surfaces. Thus, the rubber gloves adhere to each other during storage, and are difficult to wear and remove when in use. Various contrivances have been applied to this kind of rubber glove in order to eliminate tackiness or facilitate wearing and removal. To prevent tackiness of the outer surface of the glove, for example, various methods, as shown in (1) to (3) below, are carried out:

(1) A fine powder of calcium carbonate is added beforehand to a coagulating liquid composition containing a rubber latex coagulant to adhere the fine powder onto the surface of a rubber glove.
(2) The surface of rubber is chlorinated.
(3) A silicone oil or a fluorine-based surface active agent is applied to the surface of the rubber glove.

Of the above methods, the methods (1) and (2) are useful in economy, wearability/removability, and stable production, and they are the mainstream for production of rubber gloves. However, these methods pose the following problems: With the method (1), fine calcium carbonate powder is used. Thus, the fine powder easily falls off the surface of the glove, and the intended anti-tack effect cannot persist. Nor is this method preferred from hygienic and environmental aspects. For example, protein remaining in the rubber scatters by the medium of the calcium carbonate powder, causing allergy, etc. According to the method (2), the resulting rubber glove is demolded, and then chlorinated. Thus, the number of the treatment steps increases, and it is difficult to control the treatment process for chlorination (e.g., degree of chlorination, degree of washing with water for neutralization, uniform treatment). As a result, the rubber itself may decrease in strength, or change in color. Furthermore, residual chlorine gives off an odor, and the chlorination process exerts influences on the environment. The method (3), on the other hand, requires the step of applying a silicone oil or a fluorine-based surface active agent, thus increasing the number of treatment steps and decreasing productivity.

SUMMARY OF THE INVENTION

The present invention has been accomplished to solve the above-described problems with the earlier technologies. It is an object of this invention to provide a method for producing a rubber glove, which is excellent in anti-blocking properties and also in grip under dry or wet conditions, inexpensively by a simple method. Another object of the invention is to provide a method for producing a rubber glove, which is free from a decrease in the strength of the rubber itself, free from discoloration, and very comfortable to use, by a simple process, without causing any problems to hygiene and environment during production.

A first aspect of the present invention is a method for producing a rubber glove, comprising the steps of:

immersing a glove mold in a coagulating synthetic rubber latex containing one substance selected from the group consisting of thermally expansible microcapsules and a blowing agent, a rubber coagulant, and synthetic rubber in latex form stable to the rubber coagulant to form a coagulant-containing synthetic rubber film on a surface of the glove mold;

then immersing the glove mold in rubber-incorporating latex to form a gelled rubber layer on the coagulant-containing synthetic rubber film;

then heating the resulting two-layer rubber laminate to vulcanize and foam it; and demolding the vulcanized rubber laminate from the glove mold as it is turned inside out.

The present invention also relates to a two-layer rubber glove having a synthetic rubber film layer formed on an outer surface of a glove body rubber layer, the rubber glove being prepared by the method for production described above.

A second aspect of the present invention is a method for producing a rubber glove, comprising the steps of:

immersing a glove mold in a coagulating synthetic rubber latex containing one substance selected from the group consisting of thermally expansible microcapsules and a blowing agent, a rubber coagulant, and synthetic rubber in latex form stable to the rubber coagulant to form a coagulant-containing synthetic rubber film on a surface of the glove mold;

then immersing the glove mold in rubber-incorporating latex to form a gelled rubber layer on the coagulant-containing synthetic rubber film;

then immersing the glove mold, which has a two-layer rubber laminate formed thereon, in an aqueous dispersion containing synthetic rubber in latex form and organic fine particles to form an organic fine particle-containing synthetic rubber latex layer on the gelled rubber layer;

then heating the resulting three-layer rubber laminate to vulcanize and foam it; and demolding the vulcanized rubber laminate from the glove mold as it is turned inside out.

The present invention also relates to a three-layer rubber glove having a synthetic rubber film layer formed on an outer surface of a glove body rubber layer, and a lubricating resin layer formed on an inner surface of the glove body rubber layer, the rubber glove being prepared by the method for production described above.

The content of the thermally expansible microcapsules or blowing agent in the coagulating synthetic rubber latex is preferably 5 to 150 parts by weight for 100 parts by weight of the solids of the synthetic rubber in latex form. A rubber vulcanizing agent is preferably contained in the coagulating synthetic rubber latex. The content of the rubber vulcanizing agent in the coagulating synthetic rubber latex is preferably 0.5 to 10 parts by weight for 100 parts by weight of the solids of the synthetic rubber in latex form.

The rubber vulcanizing agent is preferably at least one substance selected from sulfur, zinc oxide, an inorganic salt of dithiocarbamic acid, and thiuram polysulfide.

In the coagulating synthetic rubber latex, at least one substance selected from an emulsion type silicone oil, a fine powder of synthetic resin, and a fine powder of an inorganic oxide is contained in an amount of 0.1 to 50 parts by weight for 100 parts by weight of the solids of the synthetic rubber in latex form.

A third aspect of the present invention is a method for producing a rubber glove, comprising the steps of:

immersing a glove mold in a coagulating liquid composition containing a rubber vulcanizing agent and a rubber coagulant to adhere the rubber vulcanizing agent and the rubber coagulant onto a surface of the glove mold;

then immersing the glove mold in rubber-incorporating latex to form a gelled rubber layer;

then heating the resulting two-layer rubber laminate to vulcanize it; and demolding the vulcanized rubber laminate from the glove mold as it is turned inside out.

The present invention also relates to a highly vulcanized three-layer rubber glove.

A fourth aspect of the present invention is a method for producing a rubber glove, comprising the steps of:

immersing a glove mold in a coagulating liquid composition containing a rubber vulcanizing agent and a rubber coagulant to adhere the rubber vulcanizing agent and the rubber coagulant onto a surface of the glove mold;

then immersing the glove mold in rubber-incorporating latex to form a gelled rubber layer;

then immersing the glove mold, which has the gelled rubber layer formed thereon, in an aqueous dispersion containing synthetic rubber latex and organic fine particles to form an organic fine particle-containing synthetic rubber latex layer on the gelled rubber layer;

then heating the gelled rubber layer and the organic fine particle-containing synthetic rubber latex layer to vulcanize them, thereby forming a laminate comprising the vulcanized rubber layer and a lubricating resin layer; and then turning the vulcanized laminate inside out, and demolding it from the glove mold.

The present invention also relates to a rubber glove having a lubricating resin layer on an inner surface of a rubber layer, the rubber glove being prepared by the method for production described above.

The content of the rubber vulcanizing agent in the coagulating liquid composition is preferably 0.5 to 10% by weight. The rubber vulcanizing agent is preferably at least one substance selected from the group consisting of sulfur, zinc oxide, a salt of dithiocarbamic acid, and thiuram polysulfide.

The coagulating liquid composition preferably contains 0.1 to 20% by weight of at least one substance selected from the group consisting of an emulsion type silicone resin, a powder of synthetic resin, and a fine powder of an inorganic oxide.

The above-described method for producing a rubber glove may further comprise depositing starch or talc fine powder on a surface of the gelled rubber layer.

In the method for production according to the first or second aspect of the invention, the content of the thermally expansible microcapsules or blowing agent in the coagulating synthetic rubber latex is preferably 5 to 150 parts by weight for 100 parts by weight of the solids of the synthetic rubber in latex form.

Preferably, a rubber vulcanizing agent is contained in the coagulating synthetic rubber latex. Further preferably, at least one substance selected from an emulsion type silicone oil, a fine powder of synthetic resin, and a fine powder of an inorganic oxide may be contained.

According to the method for production of the present invention, a glove mold is immersed in a coagulating synthetic rubber latex containing synthetic rubber latex, one substance selected from the group consisting of thermally expansible microcapsules and a blowing agent, and a rubber coagulant to adhere a synthetic rubber film, which contains the thermally expansible microcapsules or blowing agent in a high concentration, onto the surface of the glove mold. Thus, when a gelled rubber layer formed thereon is heated and vulcanized, the thermally expansible microcapsules or blowing agent is foamed to form a rough surface having asperities on the surface of the rubber layer, namely, the outer surface of the glove, thereby resulting in a loss of tackiness on the surface of the glove. According to the present invention, therefore, a rubber glove with high anti-blocking properties and high grip can be prepared by a series of steps ending with demolding which constitute a so-called in-line process.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
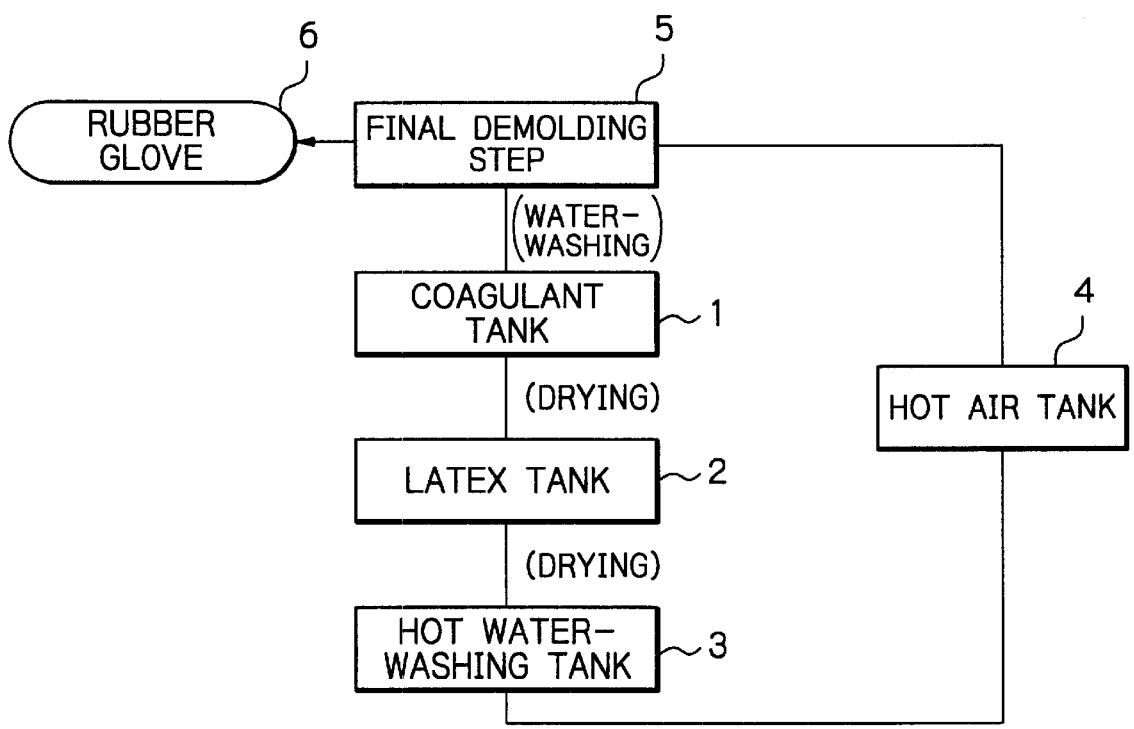
FIG. 1 is a flow sheet for a manufacturing process according to the present invention.

Preferred embodiments of the present invention will now be described in detail with reference to the accompanying drawings, which in no way limit the invention.

FIG. 1 shows a method for production according to the invention. First, several thousand glove molds are hung on a rotary chain several hundred meters long. The speed of the chain is so set that it turns fully once when one glove mold has passed through all process steps. When the moving glove mold comes above one of the tanks, it descends into the tank and then goes up.

In a first step, a glove mold which has been cleaned and washed with water, is placed in a coagulant tank 1, where it is immersed in a coagulating synthetic rubber latex containing synthetic rubber in latex form, one substance selected from the group consisting of thermally expansible microcapsules and a blowing agent, and a rubber coagulant. Then, the glove mold is withdrawn and dried to adhere a synthetic rubber film, which contains the thermally expansible microcapsules or blowing agent, onto the surface of the glove mold. In a subsequent step, this glove mold is introduced into a latex tank 2, where the glove mold is immersed in rubber-incorporating latex for forming a glove body. The glove mold is withdrawn and dried, whereafter the glove mold is leached in a hot water-washing tank 3 to extract and remove water soluble components and the coagulant. As a result, a gelled rubber layer is formed on the coagulant-containing synthetic rubber film laid on the glove mold. The gelled rubber layer is passed through a hot air tank 4 in a subsequent step, whereby the gelled rubber layer is heated and vulcanized together with the synthetic rubber film. At this time, the thermally expansible microcapsules or blowing agent is expanded or foamed by heating, thus enabling the rubber layer as a glove body to be easily peeled from the glove mold. The resulting vulcanized rubber laminate is turned inside out, and demolded from the glove mold, in a final demolding step 5 to obtain a rubber glove 6. The glove mold after demolding is cleaned and washed with water for use in a subsequent process.

The same procedure is taken in other embodiments except for the processing solutions into which the glove molds are immersed.

In the first method for producing a rubber glove according to the present invention, a glove mold is immersed in a coagulating synthetic rubber latex in the first step. Before immersion, the glove mold is cleaned with an inorganic acid or an alkaline detergent if desired, and then washed with water. Then, the glove mold, while hot at 40 to 70° C., is immersed in the coagulating synthetic rubber latex consisting essentially of synthetic rubber in latex form, one substance selected from the group consisting of thermally expansible microcapsules and a blowing agent, and a rubber coagulant. The glove mold used in the present invention has a shape corresponding to the contours of a human hand. For example, the glove mold may be in any of various shapes suitable for objects, such as a wrist-to-finger tip type, and an elbow-to-finger tip type. A porcelain mold, an aluminum casting mold, or a plastic mold is preferably used.

In the present invention, the coagulating synthetic rubber latex, in which the above glove mold is immersed, consists essentially of one substance selected from the group consisting of thermally expansible microcapsules and a blowing agent, a rubber coagulant, and synthetic rubber in latex form, and if desired, further contains a vulcanizing agent, an emulsion type silicone oil, a fine powder of synthetic resin, and a fine powder of an inorganic oxide.

As the synthetic rubber in latex form, it is necessary to use one stable to the rubber coagulant contained in the coagulating synthetic rubber latex. Thus, the synthetic rubber in latex form can be selected, as desired, depending on the rubber coagulant used. A nonionic synthetic rubber in latex form stable to the rubber coagulant is used particularly preferably. More concretely, synthetic rubber in latex form, such as acrylic modified butadiene rubber, polyurethane rubber, or acrylonitrile-butadiene rubber, which is excellent in suppleness, is suitable.

As the rubber coagulant, a metal salt, such as a calcium salt or a zinc salt, is used. Calcium nitrate, in particular, is cited as a preferred example. Other examples usable are calcium chloride, cyclohexylamine acetate, and zinc chloride. Any of these rubber coagulants is added as a solution in a solvent. As the solvent, water, an alcohol such as methyl alcohol or ethyl alcohol, or a mixture of water and an alcohol is used. The concentration of the rubber coagulant in the coagulating synthetic rubber latex is set in the range of 5 to 40% by weight, preferably 15 to 30% by weight. The content of the rubber coagulant can be set as desired.

As the thermally expansible microcapsules or blowing agent contained in the coagulating synthetic rubber latex in the present invention, any material can be used, as long as it foams during vulcanization by heating. The thermally expansible microcapsules used are microcapsules each having isobutane, isopentane, or normal pentane, encapsulated in a shell having a particle size of about 5 to 20 μm and comprising vinylidene chloride-acrylonitrile copolymer, acrylonitrile polymer, (meth)acrylate ester polymer, or styrene polymer. As the blowing agent, a hydrazine compound (e.g., toluenesulfonyl hydrazine, or benzenesulfonyl hydrazine), or an azo compound (e.g., azobisisobutyronitrile) can be used. The thermally expansible microcapsules or blowing agent is used preferably in the range of 10 to 150 parts by weight for 100 parts by weight of the solids of the synthetic rubber in latex form.

The coagulating synthetic rubber latex in the present invention may be free from, but preferably contains, a rubber vulcanizing agent for vulcanization of the synthetic rubber in latex form. As the rubber vulcanizing agent, any material may be used, as long as it is generally used to vulcanize rubber. A vulcanization accelerator, which shows a vulcanizing action, may be used. Concrete examples are sulfur, zinc oxide, magnesium oxide, a salt of dithiocarbamic acid, and thiuram polysulfide. Any of these rubber vulcanizers is contained preferably in the range of 0.5 to 10 parts by weight, more preferably in the range of 1 to 8 parts by weight, for 100 parts by weight of the nonvolatile matter of the synthetic rubber in latex form.

At least one material selected from an emulsion type silicone oil, a fine powder of synthetic resin, and a fine powder of an inorganic oxide can be contained in the coagulating synthetic rubber latex. Examples of the emulsion type silicone oil are dimethyl silicone oil, amino-modified silicone oil, and phenylmethyl silicone oil. As the synthetic resin, any material can be used, unless it generates a coagulum or an aggregate upon contact with the rubber coagulant. Examples of the synthetic resin are acrylic resin, urethane resin, polyamide resin, olefin resin, formaldehyde resin, vinyl chloride resin, vinylidene chloride resin, and crosslinked products of these resins. As the inorganic oxide, silica or alumina can be used. As a fine powder of any of these inorganic oxides, it is preferred to use one having a particle diameter of 0.5 to 20 μm. Any of the emulsion type silicone oil, the fine powder of synthetic resin, and the fine powder of inorganic oxide can be contained in the range of 0.5 to 200 parts by weight for 100 parts by weight of the solids of the synthetic rubber in latex form.

In the first step in the production method of the present invention, the glove mold is immersed in the coagulating synthetic rubber latex composed of the above-mentioned mentioned components. Then, the glove mold is withdrawn, and a coating adhering to the surface of the glove mold is dried. By this measure, there is obtained the glove mold having, adhered to its surface, a coagulant-containing synthetic rubber film comprising synthetic rubber in latex form, one substance selected from the group consisting of thermally expansible microcapsules and a blowing agent, and a rubber coagulant, and if desired, further containing a rubber vulcanizing agent, a fine powder of synthetic resin, and a fine powder of an inorganic oxide. The film thickness of the coagulant-containing synthetic rubber film is preferably set in the range of 1 to 10 μm.

In the following second step, the glove mold having the coagulant-containing synthetic rubber film adhered thereto is immersed in rubber-incorporating latex to deposit a gelled rubber layer, which will become a glove body, on the coagulant-containing synthetic rubber film formed on the surface of the glove. In the present invention, rubber latex, which has been publicly known, can be used as the rubber-incorporating latex. For example, natural rubber latex, and synthetic rubber latex such as NBR latex or chloroprene rubber latex can be used preferably. Any of these latices may contain not only a small amount of a vulcanizing agent, but also a vulcanization accelerator, an antioxidant, a thickening agent, a wetting agent, and an anti-blowing agent which are normally added to rubber latex. The rubber-incorporating latex used preferably has a nonvolatile content of 30 to 50% by weight.

The glove mold, which has been immersed in the rubber-incorporating latex, is withdrawn, and passed through a warm air tank of, for example, 60 to 100° C. for 10 to 90 seconds to form a gelled rubber layer. Then, the glove mold is extracted (leached) in hot water of 30 to 90° C. for 20 seconds to 10 minutes in order to remove water-soluble substances, such as protein, and the coagulant in the gelled rubber layer. Then, the glove mold is heated and dried for 30 seconds to 2 minutes at 70 to 100° C. As a result, the leached gelled rubber layer is formed on the coagulant-containing synthetic rubber film formed in the aforementioned step. The thickness of the gelled rubber layer is preferably set in the range of, normally, 50 to 300 µm.

If desired, an anti-tack treatment is applied to the surface of the resulting gelled rubber layer. For example, a fine powder, such as starch or talc, may be deposited, or an emulsion type silicone oil may be applied. This means can prevent tackiness of the inner surface of the resulting glove. Also, tackiness can be prevented and lubricity can be improved, for example, by applying a polymer emulsion containing fine particles of organic resin.

The gelled rubber layer after the extraction treatment is heat treated in the subsequent third step for vulcanization. That is, the gelled rubber layer is heated and dried at 90 to 130° C. for 10 to 30 minutes to vulcanize and harden the rubber in the gelled rubber layer. At this time, the thermally expansible microcapsules or blowing agent present in the synthetic rubber film foams simultaneously to form a rough surface. If a rubber vulcanizing agent is contained in the coagulant-containing synthetic rubber film, the synthetic rubber film is also vulcanized at the same time to form a film with excellent strength on the rubber layer as the glove body.

The two-layer rubber laminate composed of the synthetic rubber film and the gelled rubber layer that have been treated in the above-described manner is finally turned inside out and demolded from the glove mold. By this measure, a non-tacky rubber glove with improved surface lubricity is obtained.

According to the second production method of the present invention, the glove mold having the gelled rubber layer extracted in the above second step is further subjected to an immersion treatment. That is, the glove mold having the extracted gelled rubber layer is immersed in an aqueous dispersion containing synthetic rubber in latex form and organic fine particles to form a fine particle-containing synthetic rubber latex layer on the gelled rubber layer. The aqueous dispersion used preferably has a nonvolatile matter concentration in the range of 0.5 to 10% by weight, and has a viscosity of 1 to 300 mPa·s. To obtain a lubricating resin layer with excellent wearability and removability, in particular, the suitable concentration is 1 to 5% by weight, and the suitable viscosity is 1 to 20 Mpa·s.

By immersion in the aqueous dispersion in the above-mentioned manner, the fine particle-containing synthetic rubber latex layer (third layer) having organic fine particles dispersed in synthetic rubber is formed on the laminate composed of the synthetic rubber film (first layer) and the gelled rubber layer (second layer) to obtain a three-layer rubber laminate. The rubber laminate is heated and dried at 70 to 100° C. for 30 seconds to 2 minutes, and then if necessary, is subjected to beading (lower edge curling). The surface of the resulting fine particle-containing synthetic rubber latex layer is a roughened surface having fine asperities.

Then, the rubber laminate is heated and dried at 90 to 130° C. for 10 to 30 minutes to vulcanize and harden the synthetic rubber film as the first layer, the gelled rubber layer as the second layer, and the fine particle-containing synthetic rubber latex layer as the third layer. As a result, a three-layer vulcanized rubber laminate consisting of a synthetic rubber film, a glove body rubber layer, and a lubricating resin layer is formed. This vulcanized rubber laminate is turned inside out and demolded from the glove mold to obtain a rubber glove of the present invention which has the synthetic rubber film as an outer surface and the lubricating resin layer as an inner surface.

In the present invention, the synthetic rubber in latex form, which is used in the aqueous dispersion, is one generating no coagulum or aggregate upon contact with the above-mentioned coagulant. Examples are styrene-butadiene rubber latex, methyl methacrylate-butadiene rubber latex, acrylonitrile rubber latex, butadiene rubber latex, and isoprene rubber latex. These latices are used alone or as a mixture of two or more. The preferred latex-form synthetic rubbers are those obtained by adding nonionic surface active agents, or polymeric protective colloids typified by polyvinyl alcohol, to synthetic rubber latices stabilized with the use of anionic surface active agents. It is advisable to add a nonionic surface active agent to commercially available synthetic rubber latex, and use the mixture. The synthetic rubber in latex form may be one having a carboxyl group. The synthetic rubber in latex form is not restricted, but it is preferred to select that which forms a vulcanized film having an elongation of 300% or more, and tensile strength of 3 Mpa or more.

Examples of the organic fine particles used in the aqueous dispersion are organic fine powders of acrylic resin, urethane resin, polyamide resin, olefin resin, formaldehyde resin, vinyl chloride resin, vinylidene chloride resin, starch, and crosslinked products of these materials. These organic fine powders are used alone or as a mixture of two or more. The organic fine particles for obtaining satisfactory lubricity have an average particle diameter of 1 to 20 µm, preferably 2 to 10 µm. If the average particle diameter is less than 1 µm, the lubricity due to the asperities will be poor. If the average particle diameter exceeds 20 µm, surface roughness will result, deteriorating comfort during use. The amount of the organic fine particles added is 10 to 100 parts by weight, preferably 30 to 70 parts by weight, for 100 parts by weight of the solids of the synthetic rubber in latex form. If their amount added is less than 10 parts by weight, tackiness will be felt, and lubricity will be poor. The amount of addition in excess of 100 parts by weight, on the other hand, is not preferred, because the coating as the lubricating resin layer has too small elongation to follow the elongation of the rubber glove body, and its adhesion to the rubber glove body is insufficient. The shape of the organic fine particles is not limited, but is preferably spherical in terms of lubricity.

In the present invention, the aqueous dispersion may incorporate, in addition to the synthetic rubber in latex form and the organic fine particles, an aqueous solution or an aqueous dispersion of an amino resin, a blocked isocyanate, or an epoxy resin, as a hardening agent, in order to improve the adhesion to the rubber glove body, strength and water resistance of the lubricating resin layer. As the amino resin, water soluble methylated melamine resin, or methylated urea resin is used. An example of the blocked isocyanate is a nonionic aqueous dispersion of an isocyanate compound blocked with a publicly known blocking agent such as phenol, lactam, or oxime. Examples of the epoxy resin are aqueous sorbitol polyglycidyl ether, sorbitan polyglycidyl ether, polyglycerol polyglycidyl ether, diglycerol polyglycidyl ether, glycerol polyglycidyl ether, and polyethylene glycol glycidyl ether. The amount of any of these hardening agents added is set in the range of 1 to 50 parts by weight, preferably 5 to 30 parts by weight, for 100 parts by weight of the solids of the synthetic rubber in latex form. A publicly known catalyst may also be added for promotion of hardening unless it impairs the stability of the aqueous solution or aqueous dispersion.

To the aqueous dispersion, a thickening agent, a wetting agent, an anti-blowing agent, a pH regulator, an antioxidant, an ultraviolet absorber, a preservative, an antibacterial agent, an antistatic agent, or a colorant can be added, as desired, for the purpose of making the aqueous dispersion fully exhibit its performance. To improve the lubricity, a silicone oil emulsion may be added further. As the thickening agent used, methylcellulose, polyvinyl alcohol, or ammonium acrylate is preferred. As the wetting agent and the anti-blowing agent, a nonionic fluorine-based surface active agent, and a silicone oil emulsion are preferred.

In the second production method of the present invention, the above aqueous dispersion is used to form a lubricating resin layer of a uniform appearance on the glove body rubber layer. With this method, the generation rate of pinholes can be decreased markedly because of the three-layer structure. Furthermore, the lubricating resin layer is formed with the use of synthetic rubber latex. Thus, the lubricating resin layer has satisfactory adhesion to the glove body rubber layer as the second layer, and can follow the elongation of the glove body. In addition, because of the organic fine particles incorporated, the lubricating resin layer has asperities formed on its surface, showing lubricity. Hence, a rubber glove hygienic and excellent in wearability and removability is obtained.

In the method for producing a rubber glove according to the present invention, a glove mold is immersed in a coagulating liquid composition in the first step. Before immersion, the glove mold is cleaned with an inorganic acid or an alkaline detergent if desired, and then washed with water. Then, the glove mold, while hot at 40 to 70° C., is immersed in the coagulating liquid composition containing a rubber vulcanizing agent and a rubber coagulant. The glove mold used in the present invention has a shape corresponding to the contours of a human hand. For example, the glove mold may be in any of various shapes suitable for objects, such as a wrist-to-finger tip type, and an elbow-to-finger tip type. A porcelain mold, an aluminum casting mold, or a plastic mold is preferably used.

In the present invention, the coagulating liquid composition, in which the above glove mold is immersed, needs to contain a rubber coagulant and a rubber vulcanizing agent. As the rubber vulcanizing agent, any material may be used, as long as it is generally used to vulcanize rubber. A vulcanization accelerator, which shows a vulcanizing action, may be used. Concrete examples are sulfur, zinc oxide, magnesium oxide, a salt of dithiocarbamic acid, and thiuram polysulfide. Any of these rubber vulcanizers is contained preferably in the range of 0.5 to 10% by weight, more preferably in the range of 1 to 5% by weight, in the coagulating liquid composition.

As the rubber coagulant, a metal salt, such as a calcium salt or a zinc salt, is used. Calcium nitrate, in particular, is cited as a preferred example. Other examples usable are calcium chloride, cyclohexylamine acetate, and zinc chloride. Any of these rubber coagulants is added as a solution in a solvent. As the solvent, water, an alcohol such as methyl alcohol or ethyl alcohol, or a mixture of water and an alcohol is used. The concentration of the rubber coagulant in the coagulating liquid composition is set in the range of 10 to 40% by weight, preferably 7 to 30% by weight.

At least one material selected from an emulsion type silicone resin, a fine powder of synthetic resin, and a fine powder of an inorganic oxide can be contained in an amount of 0.1 to 20% by weight in the coagulating liquid composition. Examples of the silicone resin are dimethyl polysiloxane, diethyl polysiloxane, and methylphenyl silicone. As the synthetic resin, any material can be used, unless it generates a coagulum or an aggregate upon contact with the above coagulant. Examples of the synthetic resin are acrylic resin, urethane resin, polyamide resin, olefin resin, formaldehyde resin, vinyl chloride resin, vinylidene chloride resin, starch-based resin, and crosslinked products of these resins. As the inorganic oxide, silica or alumina can be used. As a fine powder of any of these inorganic oxides, it is preferred to use one having a particle diameter of 1 to 50 $\mu$m. After immersion in the coagulating liquid composition, the glove mold is withdrawn, and dried to have the rubber vulcanizing agent and the rubber coagulant adhering to the surface of the glove mold.

In the following step, the glove mold having the rubber vulcanizing agent and the rubber coagulant adhered thereto is immersed in rubber-incorporating latex to deposit gelled rubber on the surface of the glove mold. In the present invention, rubber latex, which has been publicly known, can be used as the rubber-incorporating latex. For example, natural rubber latex, and synthetic rubber latex such as NBR can be used preferably. Any of these rubber-incorporating latices may contain not only a small amount of a vulcanizing agent, but also a vulcanization accelerator, an antioxidant, a thickening agent, a wetting agent, and an anti-blowing agent which are normally added to rubber latex. The rubber-incorporating latex used preferably has a concentration in the range of 30 to 50% by weight. In the present invention, the thickness of the rubber layer is preferably set in the range of 50 to 300 $\mu$m.

The glove mold, which has been immersed in the rubber-incorporating latex, is withdrawn, and passed through a warm air tank of, for example, 60 to 100° C. for 10 to 90 seconds to form a gelled rubber layer. Then, the glove mold is extracted (leached) in hot water of 30 to 90° C. for 20 seconds to 10 minutes in order to remove water-soluble substances, such as protein, and the coagulant in the gelled rubber layer. Then, the glove mold is heated and dried for 30 seconds to 2 minutes at 70 to 100° C. As a result, the leached gelled rubber layer is formed on the glove mold. If desired, an anti-tack treatment is applied to the surface of the resulting gelled rubber layer. For example, a fine powder, such as starch or talc, may be deposited, or a silicone resin emulsion may be applied. This means can prevent tackiness of the inner surface of the resulting glove. Also, tackiness can be prevented and lubricity can be improved, for example, by applying a polymer emulsion containing fine particles of organic resin.

The gelled rubber layer after the extraction treatment is heat treated in the subsequent step for vulcanization. That is, the gelled rubber layer is heated and dried at 90 to 130° C. for 10 to 30 minutes to vulcanize and harden the rubber in the gelled rubber layer.

The gelled rubber layer that has been treated in the above-described manner is finally turned inside out and demolded from the glove mold. By this measure, a non-tacky rubber glove with improved surface lubricity is obtained.

In another embodiment of the present invention, the glove mold having the gelled rubber layer extracted in the above-described manner is further immersed in an aqueous dispersion containing synthetic rubber latex and organic fine particles. The aqueous dispersion used has a nonvolatile matter concentration in the range of 0.5 to 10% by weight, and has a viscosity of 1 to 300 mPa·s. To obtain a lubricating resin layer with excellent wearability and removability, in particular, the suitable concentration is 1 to 5% by weight, and the suitable viscosity is 3 to 50 mPa·s. By immersion in this aqueous dispersion, a fine particle-containing synthetic rubber latex layer (second layer) having organic fine particles dispersed in synthetic rubber and having asperities is formed on the gelled rubber layer (first layer). The resulting laminate is heated and dried at 70 to 100° C. for 30 seconds to 2 minutes, and then if necessary, is subjected to beading (lower edge curling) by a beading device.

Then, the laminate is heated and dried at 90 to 130° C. for 10 to 30 minutes to vulcanize and harden the gelled rubber layer as the first layer, and the fine particle-containing synthetic rubber latex layer as the second layer. As a result, a laminate consisting of a rubber layer, and a lubricating resin layer which have been vulcanized is formed. This vulcanized laminate is turned inside out and demolded from the glove mold to obtain a rubber glove of the present invention which has the rubber layer as an outer surface and the lubricating resin layer as an inner surface.

In the present invention, the synthetic rubber latex, which is used in the aqueous dispersion, is one generating no coagulum or aggregate upon contact with the coagulant. Examples are styrene-butadiene latex, methyl methacrylate-butadiene latex, acrylonitrile-butadiene latex, butadiene rubber latex, and isoprene rubber latex. These latices are used alone or as a mixture of two or more. The preferred synthetic rubber latices are those obtained by adding nonionic surface active agents, or polymeric protective colloids typified by polyvinyl alcohol, to latices stabilized with the use of anionic surface active agents. It is advisable to add a nonionic surface active agent to commercially available synthetic rubber latex, and use the mixture. The synthetic rubber latex may be one having a carboxyl group. The synthetic rubber latex of choice is not restricted, but it is preferred to select that which forms an unvulcanized film having an elongation of 300% or more, and tensile strength of 3 Mpa or more.

Examples of the organic fine particles used in the aqueous dispersion are organic fine powders of acrylic resin, urethane resin, polyamide resin, olefin resin, formaldehyde resin, vinyl chloride resin, vinylidene chloride resin, starch-based resin, and crosslinked products of these materials. These organic fine powders are used alone or as a mixture of two or more. The organic fine particles for obtaining satisfactory lubricity have an average particle diameter of 1 to 50 $\mu$m, preferably 2 to 30 $\mu$m. If the average particle diameter is less than 1 $\mu$m, the lubricity due to the asperities will be poor. If the average particle diameter exceeds 50 $\mu$m, on the other hand, surface roughness will result, deteriorating comfort during use. The amount of the organic fine particles added is 10 to 100 parts by weight, preferably 30 to 70 parts by weight, for 100 parts by weight of the nonvolatile matter of the synthetic rubber latex. If their amount added is less than 10 parts by weight, tackiness will be felt, and lubricity will be poor. The amount of addition in excess of 100 parts by weight, on the other hand, is not preferred, because the coating as the lubricating resin layer has too small elongation to follow the elongation of the rubber glove body, and its adhesion to the rubber glove body is insufficient. The shape of the organic fine particles is not limited, but is preferably spherical in terms of lubricity.

In the present invention, the aqueous dispersion may incorporate, in addition to the synthetic rubber latex and the organic fine particles, an aqueous solution or an aqueous dispersion of an amino resin, a blocked isocyanate, or an epoxy resin, as a hardening agent, in order to improve the adhesion to the rubber glove body, strength and water resistance of the lubricating resin layer. As the amino resin, water soluble methylated melamine resin, or methylated urea resin is used. An example of the blocked isocyanate is a nonionic aqueous dispersion of an isocyanate compound blocked with a publicly known blocking agent such as phenol, lactam, or oxime. Examples of the epoxy resin are water soluble sorbitol polyglycidyl ether, sorbitan polyglycidyl ether, polyglycerol polyglycidyl ether, diglycerol polyglycidyl ether, glycerol polyglycidyl ether, and polyethylene glycol diglycidyl ether. The amount of any of these hardening agents added is in the range of 1 to 50 parts by weight, preferably 5 to 30 parts by weight, for 100 parts by weight of the nonvolatile matter of the synthetic rubber latex. A publicly known catalyst may also be added for promotion of hardening unless it impairs the stability of the aqueous dispersion.

To the aqueous dispersion, a thickening agent, a wetting agent, an anti-blowing agent, a pH regulator, an antioxidant, an ultraviolet absorber, a preservative, an antibacterial agent, an antistatic agent, or a colorant can be added, as desired, for the purpose of making the aqueous dispersion fully exhibit its performance. To improve the lubricity, a silicone emulsion may be added. As the thickening agent used, methylcellulose, polyvinyl alcohol, or ammonium acrylate is preferred. As the wetting agent and the anti-blowing agent, a nonionic fluorine-based surface active agent, and a silicone emulsion are preferred.

In the present invention, the above aqueous dispersion is used to form a lubricating resin layer of a uniform appearance. Furthermore, the lubricating resin layer is formed with the use of synthetic rubber latex. Thus, the lubricating resin layer has satisfactory adhesion to the rubber layer as the first layer, and can follow the elongation of the glove body. In addition, because of the organic fine particles incorporated, the lubricating resin layer has asperities formed on its surface, showing lubricity. Hence, a rubber glove hygienic and excellent in wearability and removability is obtained.

EXAMPLES

The present invention will be described concretely based on the following examples, which are not limitative of the invention, and in which "parts" and "%" are parts by weight and % by weight, respectively.

Example 1

A porcelain glove mold was washed with water, and heated to 50° C. Then, the glove mold was immersed for 3 seconds in coagulating rubber latex having the composition shown in column A of Table 1. The glove mold was withdrawn and dried to adhere a synthetic rubber film, 5 $\mu$m thick and containing a vulcanizing agent, microcapsules and a coagulant, onto the surface of the glove mold. Then, the glove mold was immersed for 5 seconds in rubber-incorporating latex having the composition shown in Table 2 and consisting essentially of natural rubber latex. After being withdrawn, the glove mold was dried at 100° C. for 90 seconds to form a gelled rubber layer, 150 $\mu$m thick and comprising natural rubber latex, on the synthetic rubber film laid on the surface of the glove mold. Further, the glove mold having the gelled rubber layer formed thereon was immersed in hot water of 60° C. for 60 seconds to extract and remove water soluble substances and the coagulant. After the glove mold was withdrawn, warm air of 90° C. was blown to the gelled rubber layer to remove moisture on the surface. Then, the gelled rubber layer after extraction was heated and dried for 15 minutes in a dryer at 120° C. to prepare a vulcanized rubber glove layer about 110 $\mu$m thick and composed of a two-layer rubber laminate. On this occasion, a bulge was observed between the glove mold and the rubber glove layer, whereby the glove mold and the rubber glove layer were separated from each other. Then, the vulcanized rubber glove layer was turned inside out and removed from the glove mold to obtain a rubber glove which was easily peelable and not tacky on the surface. To evaluate the rubber glove, two of the rubber gloves prepared as above were placed one on top of the other, with their surfaces superposed, and a load of 100 g/cm² was imposed thereon. The sample was allowed to stand for 2 hours in a thermohygrostatic chamber at 70° C. and humidity of 80% RH. Then, its adhesion was examined. The results are shown in Table 3.

Comparative Example 1

A rubber glove was prepared in the same manner as in Example 1, except that coagulating synthetic rubber latex having the composition shown in B of Table 1 was used. When the rubber glove layer after vulcanization was turned inside out and peeled from the glove mold, the rubber glove layer was tacky to the glove mold. When pulled strongly, the rubber glove layer tore, giving an impracticable rubber glove. The rubber glove was evaluated for adhesion in the same way as in Example 1. The results are shown in Table 3.

Comparative Example 2

A glove was prepared in the same manner as in Example 1, except that a coagulating liquid composition having the formulation shown in C of Table 1 was used instead of the coagulating synthetic rubber latex. The rubber glove could be easily turned inside out and removed from the glove mold. However, treatment with the coagulating liquid composition resulted in scatter of fine powder of calcium carbonate during operation, posing problems with hygiene and environment. The glove was evaluated for adhesion in the same way as in Example 1. The results are shown in Table 3.

TABLE 1

| Component | A | B | C (Comp. Ex.) |
|---|---|---|---|
| Acrylic modified butadiene rubber latex (nonvolatile content 47%) | 213 | 213 | — |
| Sulfur (50% aqueous dispersion) | 6 | 6 | — |
| Zinc oxide (50% aqueous dispersion) | 6 | 6 | — |
| SDC (30% aqueous solution) | 6.7 | 6.7 | — |
| PP1000 | 30 | 30 | — |
| Thermally expansible microcapsules containing isobutane | 40 | — | — |
| Fine powder of calcium carbonate | — | — | 120 |
| 20% aqueous Calcium nitrate | 2400 | 2400 | 2400 |
| Total | 2701.7 | 2661.7 | 2520 |

SDC: Sodium diethyl dithiocarbamate
PP1000: Styrene-acrylate hollow polymer

TABLE 2

| Component | Part by weight |
|---|---|
| Natural rubber latex | 167 |
| 10% Potassium hydroxide | 5 |
| Nocrac NS-6 | 0.6 |
| ZMBT | 0.1 |
| ZDEC | 0.3 |
| ZDBC | 0.5 |
| Sulfur | 0.5 |

TABLE 2-continued

| Component | Part by weight |
|---|---|
| Zinc oxide | 0.5 |
| Titanium oxide | 0.3 |
| Wetting agent | 1 |
| Ammoniacal casein | 0.1 |
| Deionized water | 94.1 |
| Total | 270 |

Natural rubber latex: nonvolatile content 60% by weight
Nocrac NS-6: 2,2'-Methylenebis(4-methyl-6-butylphenol)
ZMBT: Zinc mercaptobenzothiazole
ZDEC: Zinc diethyldithiocarbamate
ZDBC: Zinc dibutyldithiocarbamate
Wetting agent: Polyflow KL-243 (Kyoei Kagaku)

TABLE 3

|  | Ex. 1 | Comp. Ex. 1 | Comp. Ex. 2 |
|---|---|---|---|
| Coagulating synthetic rubber latex or coagulating liquid composition | A | B | C |
| Mold releasability of rubber glove after vulcanization | Good | Peeling difficult | Good |
| After 2 hours at 70° C., 80% RH | 3–4 | 1–2 | 3–4 |

As the results of Table 3 show, in the case of Example 1 using the coagulating synthetic rubber latex containing the synthetic rubber in latex form, rubber coagulant, vulcanizing agent, and thermally expansible microcapsules, mold releasability was satisfactory. Even after the glove was allowed to stand for 2 hours at 70° C. and 80% RH, adhesion between the surfaces of the gloves was not practically problematical. When the coagulating synthetic rubber latex of Comparative Example 1 free from the thermally expansible microcapsules was used, the glove peeled from the glove mold with difficulty. Moreover, the surfaces of the gloves adhered, and the adhesion was firm, posing problems in practical use. When the coagulating liquid composition of Comparative Example 2 free from the synthetic rubber in latex form was used, fine powder of calcium carbonate scattered during the manufacturing process for the glove, causing hygienic and environmental problems.

Example 2

A gelled rubber layer of 150 μm in thickness and comprising natural rubber latex was formed on the surface of a glove mold by the same treatment as in Example 1. Similarly, the glove mold was immersed and extracted to form a two-layer rubber laminate composed of a synthetic rubber film (first layer) and a gelled rubber layer (second layer).

Then, the glove mold having the rubber laminate formed thereon was immersed for 10 seconds in an aqueous dispersion having the composition shown below to form a fine particle-containing rubber latex layer as a third layer. Then, the three-layer rubber laminate composed of the first, second and third layers was heat cured at 120° C. for 20 minutes. As a result, a three-layer rubber laminate having a lubricating resin layer (third layer) of about 2 μm in thickness was obtained. Then, the resulting rubber laminate was turned inside out and removed from the glove mold to obtain a natural rubber glove having the lubricating resin layer provided on the inner surface.

| Aqueous dispersion | |
|---|---|
| SB rubber latex (styrene content 30%, nonvolatile content 40%) | 100 parts |
| Crosslinked methyl methacrylate fine particles (average particle diameter 3 μm) | 30 parts |
| Aqueous solution of ammonium polyacrylate (thickening agent) | 20 parts |
| Polyoxyethylene-polyoxypropylene block copolymer (emulsifying agent) | 3 parts |
| Wetting agent (Polyflow KL-243, Kyoei Kagaku) | 1 part |

The resulting rubber glove gave the same results of adhesion evaluation as in Example 1. The rubber glove had excellent wearability and removability, because of the lubricating resin layer provided on the inside of the glove.

Example 3

A gelled rubber layer of 150 μm in thickness and comprising natural rubber latex was formed on the surface of a glove mold by the same treatment as in Example 1. Similarly, the glove mold was immersed in hot water for extraction to form a two-layer rubber laminate composed of a synthetic rubber film (first layer) and a gelled rubber layer (second layer). Then, an aqueous dispersion (20%) of starch was applied by immersion to deposit fine particles of starch on the gelled layer. Then, the laminate was heat treated in the same manner as in Example 1 to vulcanize the synthetic rubber film and the gelled rubber layer. The resulting rubber laminate was turned inside out and removed from the glove mold to obtain a rubber glove. The rubber glove was also satisfactory in mold releasability as in Example 1. Similarly, the adhesion between the surfaces of the gloves was not problematical practically.

Example 4

A porcelain glove mold was washed with water, and heated to 50° C. Then, the glove mold was immersed for 5 seconds in a coagulating liquid composition having the formulation shown in column A of Table 4. The glove mold was withdrawn and dried to adhere a vulcanizing agent and a coagulant onto the surface of the glove mold. Then, the glove mold was immersed for 8 seconds in rubber-incorporating latex having the composition shown in Table 5 and consisting essentially of natural rubber latex. After being withdrawn, the glove mold was predried at 100° C. for 90 seconds to form a gelled layer, 150 μm thick and comprising natural rubber latex, on the surface of the glove mold. Further, the glove mold having the gelled layer formed thereon was immersed in hot water of 60° C. for 60 seconds to extract and remove water soluble substances and the coagulant. After the glove mold was withdrawn, warm air of 90° C. was blown to the gelled layer to remove moisture on the surface. Then, the gelled layer after extraction was heated and dried for 15 minutes in a dryer at 120° C. to form a vulcanized rubber layer about 110 μm thick. Then, the vulcanized rubber layer was turned inside out and removed from the glove mold to obtain a rubber glove having no tackiness on the surface.

TABLE 4

(Coagulating liquid composition)

| Component | A | B | C |
|---|---|---|---|
| Sulfur (50% aqueous dispersion) | 10 | 10 | 0 |
| Zinc oxide (50% aqueous dispersion) | 10 | 10 | 0 |
| PPD (25% aqueous dispersion) | 10 | 10 | 0 |
| ZDBC (25% aqueous dispersion) | 5 | 5 | 0 |
| Silica (17% aqueous dispersion) | 0 | 20 | 0 |
| Silicone emulsion (17% aqueous dispersion) | 0 | 20 | 0 |
| Calcium nitrate (20% aqueous solution) | 400 | 600 | 400 |

PPD: Piperidine pentamethylenedithiocarbamate
ZDBC: Zinc dibutyldithiocarbamate
Silicone emulsion: Dimethyl polysiloxane To evaluate the rubber glove, two of the rubber gloves were placed one on top of the other, with their surfaces superposed, and a load of 100 g/cm$^2$ was imposed thereon. The sample was allowed to stand for 2 hours in a dryer at 100° C., and then examined for adhesion between the surfaces of the gloves. Similarly, the sample was allowed to stand for 2 hours in a thermo-hygrostatic chamber at 70° C. and humidity of 80% RH. Then, its adhesion was examined. The results are shown in Table 5.

Example 5

A rubber glove was prepared in the same manner as in Example 1, except that a coagulating liquid composition having the formulation shown in B of Table 6 was used. The rubber glove was evaluated for adhesion in the same way as in Example 4. The results are shown in Table 5.

Comparative Example 3

A rubber glove was prepared in the same manner as in Example 4, except that a coagulating liquid composition having the formulation shown in C of Table 6 was used. The rubber glove was evaluated for adhesion in the same way as in Example 4. The results are shown in Table 5.

Evaluation criteria for adhesion in Table 5 are as follows:
1: Both surfaces completely adhere, making peeling difficult.
2: Peeling is possible, but the surfaces adhere.
3: Slight adhesion is observed, but the surfaces can be easily peeled.
4. Practically problematical adhesion does not occur.
5: No adhesion takes place.

TABLE 5

(Evaluation of adhesion)

| | Ex. 4 | Ex. 5 | Comp. Ex. 3 |
|---|---|---|---|
| Coagulating liquid composition | A | B | C |
| 100° C., 2 hrs, load 100 g/cm$^2$ | 4 | 4–5 | 2 |
| 70° C., 80% RH, 2 hrs, load 100 g/cm$^2$ | 3–4 | 4–5 | 1–2 |

As the results of Table 5 show, in the case of Examples 4 and 5 using the coagulating liquid composition containing the vulcanizing agent, adhesion was not practically problematical, even after the glove was allowed to stand for 2 hours in a dryer at 100° C. With Comparative Example 3 using the coagulating liquid composition free from the vulcanizing agent, the rubber gloves adhered, posing a problem in practical use. When the glove was allowed to stand for 2 hours in a thermo-hygrostatic chamber at 70° C.

and humidity of 80% RH, Example 4 showed slight adhesion, but peeling was easy, presenting no problem in practical use. In Example 5, little adhesion occurred. With Comparative Example 3, the gloves completely adhered, sometimes making peeling difficult.

Example 6

A gelled layer of 150 μm in thickness and comprising natural rubber latex was formed on the surface of a glove mold by the same treatment as in Example 4. Similarly, the glove mold was immersed in hot water to form an extracted gelled layer (first layer).

Then, the glove mold having the first layer formed thereon was immersed for 10 seconds in an aqueous dispersion having the composition shown below to form a fine particle-containing rubber latex layer as a second layer on the first layer. Then, the first layer and the second layer were heat cured at 120° C. for 20 minutes to obtain a laminate having a lubricating resin layer (second layer) of about 1 μm in thickness. Then, the resulting laminate was turned inside out and removed from the glove mold to obtain a natural rubber glove having the lubricating resin layer provided on the inner surface.

| Aqueous dispersion | |
|---|---|
| SB rubber latex (styrene content 30%, solids content 40%) | 100 parts |
| Crosslinked polymethyl methacrylate fine particles (average particle diameter 3 μm) | 30 parts |
| Aqueous solution of ammonium polyacrylate (thickening agent) | 20 parts |
| Polyoxyethylene-polyoxypropylene block copolymer (emulsifying agent: HLB15) | 3 parts |
| Wetting agent (Polyflow KL-243, Kyoei Kagaku) | 1 part |

The resulting natural rubber glove gave the same results of adhesion evaluation as in Example 4. The glove had excellent wearability and removability, because of the lubricating resin layer provided on the inside of the glove.

Example 7

A gelled layer of 150 μm in thickness and comprising natural rubber latex was formed on the surface of a glove mold by the same treatment as in Example 4. Similarly, the glove mold was immersed in hot water to form an extracted gelled layer. Then, an aqueous dispersion (20%) of starch was applied by immersion to deposit fine particles of starch on the gelled layer. Then, the gelled layer was heat treated in the same manner as in Example 4 to vulcanize the gelled layer. The resulting product was turned inside out and removed from the glove mold to obtain a natural rubber glove. Tackiness of the resulting rubber glove is trouble-free.

According to the present invention, excellent rubber gloves can be obtained.

As described by way of the examples and comparative examples, the production methods of the present invention have the foregoing features. Thus, a glove outer surface without tackiness can be formed in an in-line process ending with demolding of a rubber glove formed from a glove mold. That is, according to the present invention, a synthetic rubber film containing thermally expansible microcapsules or a blowing agent in a high concentration is adhered to the surface of the glove mold. This film is foamed by heat treatment for vulcanization. As a result, the surface, which will be the outer surface of the glove, is a rough surface having asperities, and loses tackiness. This facilitates demolding from the glove mold, and obviates the need for a post-demolding treatment step for imparting anti-tack properties, such as chlorination treatment. Thus, the manufacturing process is markedly simplified. Furthermore, the rubber glove prepared by the present invention has excellent grip under dry or wet conditions, and is excellent in anti-blocking properties, so that the gloves, if superposed, do not adhere. Besides, the outer surface of the glove is not chlorinated. Consequently, the glove is free from discoloration of rubber, decreased durability due to decline in physical properties, and environmental problems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a rubber glove, comprising the steps of:

immersing a glove mold in a coagulating synthetic rubber latex containing a rubber latex coagulant, and a synthetic rubber in latex form stable to the rubber coagulant and an expanding agent selected from the group consisting of thermally expansible microcapsules and a blowing agent to form a coagulant-containing synthetic rubber film on a surface of the glove mold;

then immersing the glove mold in rubber-incorporating latex to form a gelled rubber layer on the coagulant-containing synthetic rubber film;

then heating the resulting two-layer rubber laminate to vulcanize the rubber laminate; and demolding the vulcanized rubber laminate from the glove mold as it is turned inside out.

2. The method for producing a rubber glove as claimed in claim 1, wherein the coagulating synthetic rubber latex further contains a vulcanizing agent.

3. The method for producing a rubber glove as claimed in claim 1, further comprising depositing a fine powder of starch or talc on a surface of the gelled rubber layer.

4. The method for producing a rubber glove as claimed in claim 1, further comprising the step of immersing the rubber laminate after the vulcanizing step in chlorine-treating water.

5. The method for producing a rubber glove as claimed in claim 1, wherein a content of the thermally expansible microcapsules or blowing agent in the coagulating synthetic rubber latex is 5 to 150 parts by weight for 100 parts by weight of solids of the synthetic rubber in latex form.

6. The method for producing a rubber glove as claimed in claim 1, wherein a vulcanizing agent for the rubber is at least one substance selected from sulfur, zinc oxide, an inorganic salt of dithiocarbamic acid, and thiuram polysulfide.

7. The method for producing a rubber glove as claimed in claim 1, wherein at least one substance selected from an emulsion type silicone oil, a fine powder of synthetic resin, and a fine powder of an inorganic oxide is contained in the coagulating synthetic rubber latex, said one substance being contained in an amount of 0.1 to 50 parts by weight for 100 parts by weight of solids of the synthetic rubber in latex form.

8. A method for producing a rubber glove, comprising the steps of:

immersing a glove mold in a coagulating synthetic rubber latex containing one substance selected from the group consisting of thermally expansible microcapsules and a blowing agent, a rubber coagulant, and synthetic rubber in latex form stable to the rubber coagulant to form a coagulant-containing synthetic rubber film on a surface of the glove mold;

then immersing the glove mold in rubber-incorporating latex to form a gelled rubber layer on the coagulant-containing synthetic rubber film;

then immersing the glove mold, which has a two-layer rubber laminate formed thereon, in an aqueous dispersion containing synthetic rubber in latex form and organic fine particles to form an organic fine particle-containing synthetic rubber latex layer on the gelled rubber layer;

then heating the resulting three-layer rubber laminate to vulcanize the rubber laminate; and demolding the vulcanized rubber laminate from the glove mold as it is turned inside out.

9. The method for producing a rubber glove as claimed in claim 8, wherein a content of the thermally expansible microcapsules or blowing agent in the coagulating synthetic rubber latex is 10 to 150 parts by weight for 100 parts by weight of solids of the synthetic rubber in latex form.

10. The method for producing a rubber glove as claimed in claim 8, wherein a rubber vulcanizing agent is contained in the coagulating synthetic rubber latex.

11. The method for producing a rubber glove as claimed in claim 8, wherein a content of the rubber vulcanizing agent in the coagulating synthetic rubber latex is 0.5 to 10 parts by weight for 100 parts by weight of solids of the synthetic rubber in latex form.

12. The method for producing a rubber glove as claimed in claim 8, wherein a vulcanizing agent for the rubber is at least one substance selected from sulfur, zinc oxide, an inorganic salt of dithiocarbamic acid, and thiuram polysulfide.

13. The method for producing a rubber glove as claimed in claim 8, wherein at least one substance selected from an emulsion type silicone oil, a fine powder of synthetic resin, and a fine powder of an inorganic oxide is contained in the coagulating synthetic rubber latex, said one substance being contained in an amount of 0.1 to 50 parts by weight for 100 parts by weight of solids of the synthetic rubber in latex form.

14. The method for producing a rubber glove as claimed in any one of claim 10, wherein the coagulating liquid composition contains 0.1 to 20% by weight of at least one substance selected from the group consisting of an emulsion type silicone resin, a powder of synthetic resin, and a fine powder of an inorganic oxide.

15. A method for producing a rubber glove, comprising the steps of:

immersing a glove mold in a coagulating liquid composition containing a rubber vulcanizing agent and a rubber coagulant to adhere the rubber vulcanizing agent and the rubber coagulant onto a surface of the glove mold, said coagulating liquid composition being in the absence of rubber latex;

then immersing the glove mold in rubber-incorporating latex to form a gelled rubber layer;

then heating the resulting two-layer rubber laminate to vulcanize the rubber laminate; and demolding the vulcanized rubber laminate from the glove mold as it is turned inside out.

16. The method for producing a rubber glove as claimed in claim 15, further comprising the step of immersing the rubber laminate after the vulcanizing step in chlorine-treating water.

17. The method for producing a rubber glove as claimed in claim 15, further comprising depositing a fine powder of starch or talc on a surface of the gelled rubber layer.

18. The method for producing a rubber glove as claimed in claim 15, wherein a content of the rubber vulcanizing agent in the coagulating liquid composition is 0.5 to 10% by weight.

19. The method for producing a rubber glove as claimed in claim 15, wherein the rubber vulcanizing agent is at least one substance selected from the group consisting of sulfur, zinc oxide, a salt of dithiocarbamic acid, and thiuram polysulfide.

20. The process of claim 15, wherein said coagulating liquid composition consists essentially of said rubber vulcanizing agent and said rubber coagulant.

21. The process of claim 15, wherein said coagulating liquid composition consists essentially of said rubber vulcanizing agent, said rubber coagulant and at least one material selected from the group consisting of an emulsion type silicone resin, a fine powder of a synthetic resin and a fine powder of an inorganic oxide.

22. The process of claim 21, wherein said coagulating liquid composition contains said at least one material in an amount of 0.1 to 20 wt % based on the weight of said coagulating liquid composition.

23. A method for producing a rubber glove, comprising the steps of:

immersing a glove mold in a coagulating liquid composition containing a rubber vulcanizing agent and a rubber coagulant to adhere the rubber vulcanizing agent and the rubber coagulant onto a surface of the glove mold;

then immersing the glove mold in rubber-incorporating latex to form a gelled rubber layer;

then immersing the glove mold, which has the gelled rubber layer formed thereon, in an aqueous dispersion containing synthetic rubber latex and organic fine particles to form an organic fine particle-containing synthetic rubber latex layer on the gelled rubber layer;

then heating the gelled rubber layer and the organic fine particle-containing synthetic rubber latex to vulcanize the gelled rubber layer and the organic fine particle-containing synthetic rubber latex, thereby forming a laminate comprising the vulcanized rubber layer and a lubricating resin layer; and then turning the vulcanized laminate inside out, and demolding the vulcanized laminate from the glove mold.

24. The method for producing a rubber glove as claimed in claim 23, wherein a content of the rubber vulcanizing agent in the coagulating liquid composition is 0.5 to 10% by weight.

25. The method for producing a rubber glove as claimed in claim 23, wherein the rubber vulcanizing agent is at least one substance selected from the group consisting of sulfur, zinc oxide, a salt of dithiocarbamic acid, and thiuram polysulfide.

26. The method for producing a rubber glove as claimed in claim 23, wherein the coagulating liquid composition contains 0.1 to 20% by weight of at least one substance selected from the group consisting of an emulsion type silicone resin, a powder of synthetic resin, and a fine powder of an inorganic oxide.

* * * * *